Feb. 26, 1929. 1,703,141

J. N. FOUNTAIN

DECKLING MACHINE

Filed Feb. 29, 1928   2 Sheets-Sheet 2

INVENTOR.
Joseph N. Fountain
BY
ATTORNEYS.

Patented Feb. 26, 1929.

1,703,141

UNITED STATES PATENT OFFICE.

JOSEPH N. FOUNTAIN, OF WESTFIELD, MASSACHUSETTS, ASSIGNOR TO OLD COLONY ENVELOPE COMPANY, OF WESTFIELD, MASSACHUSETTS, A CORPORATION OF MASSACHUSETTS.

DECKLING MACHINE.

Application filed February 29, 1928. Serial No. 258,023.

This invention relates to improvements in deckling machines for deckling the edges of such material as paper, cardboard, and the like, and is directed particularly to improvements in a machine of the type shown and described in a United States Letters Patent No. 1,607,193 issued to me November 16, 1926.

In the machine of the patent referred to, independently driven rotating cutting tools having spiral cutting teeth are arranged to act with a shearing action on opposite side edges of a web of material. According to the novel features of this invention I provide means in such a machine whereby the cutting tools and driving mechanism are not only adjustable angularly with respect to the edge of the web being operated on, but are adjustable towards and away from one another so that opposite edges of various width webs may be operated upon simultaneously.

According to another novel feature of the present invention, I provide means for feeding a web past the cutting elements at various predetermined rates of speed, by the provision of coacting feed rolls for engaging opposite sides of the web, the shafts for which rolls are driven by mechanism which is adjustable to vary the speed of the rolls as conditions require, in connection with various weights, thicknesses, or kinds of material.

According to a further novel feature of the invention, I provide means for guiding the feed roll shafts at points adjacent the cutters in any of their relative positions of adjustment, so as to hold said shafts on their true axis of rotation and thereby maintain the shafts at a constant distance apart so that the feed rolls will bear with a constant pressure on said web to effect a uniform feeding of the web. This is accomplished by providing a bearing for the shafts which is fixed to and movable with the adjustable cutting head.

A further novel feature of the invention is the provision of guides for feeding a web to the deckling tools and for receiving the deckled web which are adjustable to receive webs of various widths. This is accomplished by providing guides fixed to the movable head so that as the head is moved for adjustment for operating on webs of various widths the guides are moved thereby to accommodate webs of the width for which the heads have been adjusted.

As a still further feature of the invention, I provide means for collecting and removing the particles of material away from the cutting tools. This is accomplished by a suction apparatus, the suction nozzles of which are held in position adjacent the cutting element and adjustable therewith as the machine is adjusted for webs of various widths.

Other novel features and advantages of the invention will be observed from the following description which, for purposes of disclosure, is illustrated in the form at present preferred by means of the accompanying drawings, in which—

Figure 1:
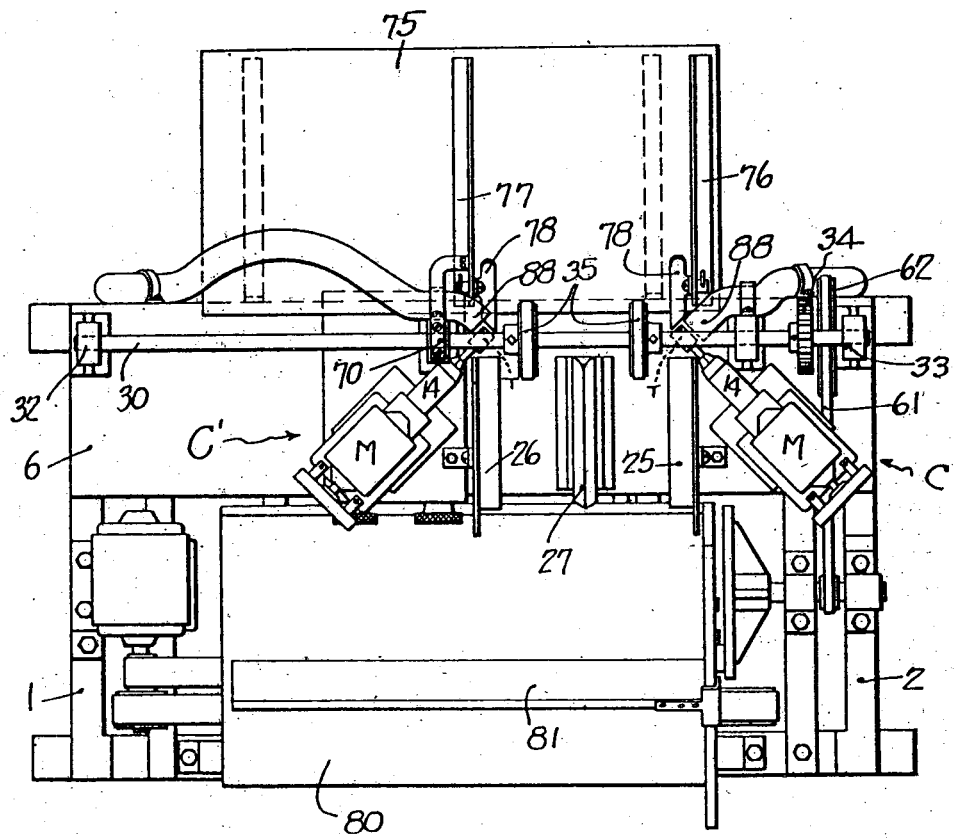
Fig. 1 is a plan view of a machine embodying the features of the invention.
Figure 2:
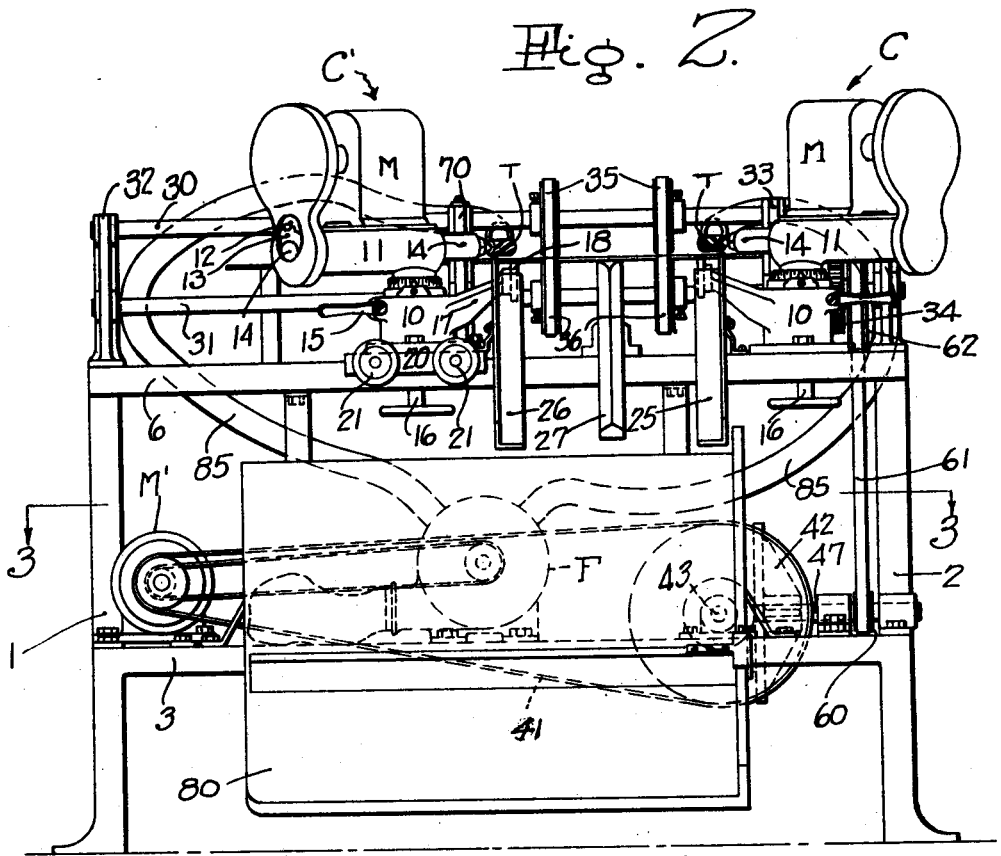
Fig. 2 is a front elevational view of the same.
Figure 3:
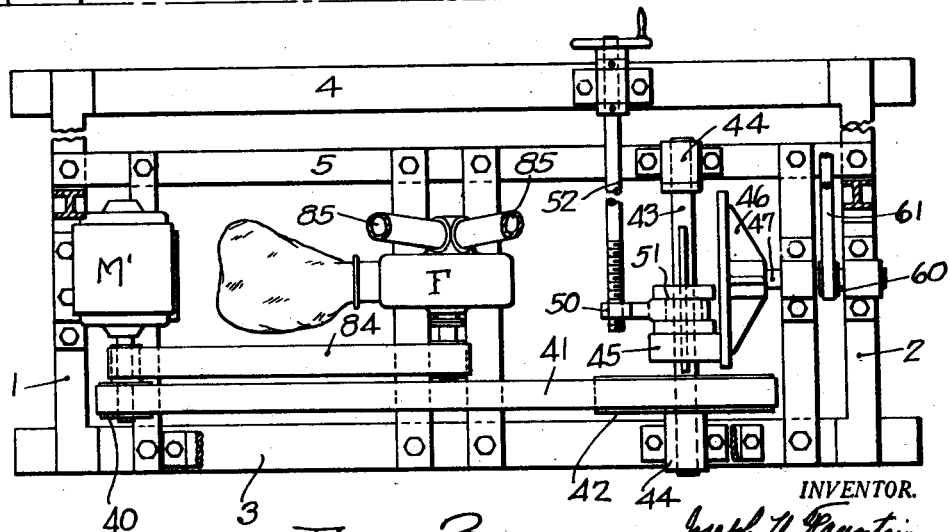
Fig. 3 is a sectional plan view on the line 3—3 of Fig. 2.

Referring to the drawings, the novel features of the invention will now be described in detail.

A frame consisting of the side members 1 and 2 and the transverse tie members 3, 4, 5, and a bed 6, which are tied together, is provided for supporting the parts of the apparatus.

Cutter heads C and C' each comprise a support 10 in which is swiveled for turning a holder 11 supporting a motor M that is geared by gears 12 and 13 to a tool shaft 14 rotatable in said holder. The holders are adapted for turning so that the tool shafts 14 may be disposed with reference to the web of material being deckled at any desired angle. The holders are clamped in adjusted positions by clamps 15 while they are adjustable up and down by screws 16 to move cutting tools T towards or away from a web of material. Brackets 17 extending outwardly from the supports 10 carry disc-like members 18 for backing up or supporting the edges of a web directly beneath the cutting or deckling tools T of the shafts 14. All this is similar to the mechanism shown and described in the patent referred to. The support 10 of the cutter head C is secured to the bed member 6 while the support of the other cutter head C' is fixed to a member 20 which is slidable along the member 6 so as to be movable towards and away from the cutter head C whereby the cutting tools may be positioned at various distances apart for operating on webs of various widths. Binding screws 21 threaded in the member 20 are arranged to clamp the member to the cross member 6 in various positions of adjustment.

An inclined side guide 25 is fixed to the bed member 6 and a similar guide 26 is fixed to the slide 20 so that as the slide is moved with respect to the head C the guide is carried thereby so as to be the proper distance from the guide 25 to accommodate the particular width web being operated on by the deckle tools.

A support 27 between the guides is provided for supporting the central portion of a web as it is fed forwardly, and of course is inclined as are the guides.

Shafts 30 and 31 journaled in bearings 32 and 33 are carried by the frame of the machine and are geared together at their outer ends by gears 34. Feed rolls 35 and 36 adjustable along the said shafts 30 and 31 are provided which may be set so as to align with one another in pairs so that they may receive between the bite thereof a web of material and feed it forwardly past the cutters and onto the guides 25 and 26.

It is desirable that these rolls be driven at some constant or uniform speed, so as to feed the web forwardly past the cutters at a predetermined uniform speed. Various speeds may be selected for the feed rolls and shafts and will depend upon the particular web being deckled and it may well be that for one kind of material they must be operated at a speed different from that required for another.

The rolls and shafts are driven as follows: A motor M' is carried by the frame and has a driving pulley 40 which is connected by a belt 41 to a pulley 42 of a shaft 43 rotatable in bearings 44 of the frame. A driver 45 non-rotatable on the shaft but slidable therealong has its periphery in contact with a driven disc 46 of a shaft 47. The driver is moved back and forth along the shaft 43 by a fork 50 which engages a suitable groove of the driver 45, while a screw 52 rotatable in the frame has a screw threaded portion in engagement with the fork. As the fork is thereby moved back or forth, the driver is moved towards or away from the shaft 47 so that the disc 46 and shaft may be driven at different speeds.

A pulley 60 of the shaft 47 is connected by a belt 61 to a pulley 62 fixed on the shaft 31, so that the shafts 30 and 31 and the feed rolls may be driven at various predetermined speeds.

It is desirable that the rolls bear with a uniform pressure on the web at all times, in order to feed the web uniformly, as is desired, and to that end, to prevent a relative springing movement of the shafts, a bearing bracket 70 is carried by the slide 20 which slidably receives the shafts 30 and 31 and serves to maintain them on their true axis of rotation and to prevent a springing tendency as the rolls engage a web of material.

The rolls 35 and 36 are preferably adjusted lengthwise of the shaft so as to engage the web adjacent its side edges. As the rolls nearest the cutter head C' are adjusted according to the position of the head, the shafts are guided near the said rolls by the bearing 70 which is fixed to the slide so as to be movable therewith accordingly as the slide is adjusted.

A plate 75 carried by the frame serves as a support for a stack of material to be fed forwardly of the machine and a side guide 76 cooperates with a similar guide 77 fixed to the bracket which is movable with the head C and arranged for adjustment to accommodate material of various widths. Hold downs 78 carried by the guide 76 and the guide 77 are arranged to bear on a sheet of material as it is fed forwardly of the machine.

An inclined receiving table 80 carried by the frame is disposed so as to receive deckled material delivered thereto by the guides 25 and 26 and has a stop 81 movable and adjustable therealong so that as deckled material falls onto the table the rear edges of the sheets will bring up against the stop so as to be formed into an even pile or stack.

A suction device F in the form of a fan is carried by the frame and is driven by a belt 84 from the motor M. The suction or inlet side thereof has extending therefrom flexible conduits or pipes 85 while the discharge end thereof carries a bag 86 resembling a bag usually employed in connection with a vacuum cleaner.

The intake pipes 85 extend upwardly to points near the cutting tools and are secured to the brackets 33 and 70 while nozzles 88 at the ends thereof are disposed adjacent the tools so that any material cut from the web will be immediately taken up and conveyed away from the cutters.

By securing the end of the pipe to the bracket 70 it will be moved thereby as the slide is moved back and forth, so that the nozzle will be disposed in proper position with respect to the cutting tools at all times.

From the foregoing it will be observed that I have provided an apparatus wherein cutter heads are relatively adjustable with respect to one another so that webs of various widths may be operated on. Also it will be noted that I have provided a guideway which is adjustable in width to accommodate various widths of material. The guideway adjustment is effected by the movement of a cutter head so that the guideway is formed to a width for receiving a web of such a width as the cutter heads are adjusted to operate on. And as a still further feature, it will be observed that I have provided a bearing for the feed roll shafts which is movable with the adjustable cutter head so as to support said shafts adjacent said cutter head to prevent a springing of the shafts and separation of said rolls during their feeding function.

Various changes may be made in the form of the invention without departing from the scope thereof, and I prefer to be limited if at all by the appended claims, rather than by the foregoing description.

What I claim is:

1. A machine of the class described comprising in combination, a frame, cutter heads on said frame each including a rotary cutting tool to operate upon one side of a web of material having its axis of rotation disposed in a plane substantially parallel to that of said web, the said heads being relatively adjustable so that said tools may be disposed to operate on webs of various widths.

2. In a machine of the class described comprising in combination, a frame, cutter heads on said frame each including a rotary cutting tool to operate upon one side of a web of material having its axis of rotation disposed in a plane substantially parallel to that of said web, one of said heads being fixed on said frame and the other being relatively adjustable on said frame so that said tools may operate on opposite edges of webs of various widths, shafts journaled in said frame, coacting feed rolls adjustable along said shafts, and a bearing associated with said adjustable head for guiding said shafts adjacent said head to prevent a springing of said shafts and separation of said rolls.

3. In a machine of the class described comprising in combination, a frame, cutter heads on said frame each including a rotary cutting tool to operate upon one side of said web having its axis of rotation disposed in a plane substantially parallel to that of said web, one of said heads being fixed on said frame and the other being relatively adjustable on said frame so that said tools may operate on opposite edges of webs of various widths, shafts journaled in said frame, coacting feed rolls adjustable along said shafts, a bearing associated with said adjustable head for guiding said shafts adjacent said head to prevent a springing of said shafts and separation of said rolls, a guide member extending forwardly of said fixed head and a guide member on said adjustable head cooperating therewith to form a guideway to accommodate a web of a width for which the heads are adjusted to operate on.

4. In a machine of the class described comprising in combination, a support, cutter heads on said frame each including a rotary cutting tool to operate upon one side of a web having its axis of rotation substantially parallel to the plane of said web, one of said heads being fixed to said support and the other being movable towards and away from the first named head so that the cutters may be positioned to operate on webs of various widths, the said cutters being adjustable so that they may be disposed at various angles with respect to the side edges of a web, a pair of parallel shafts rotatable on said support, coacting feed rolls adjustable therealong so as to be adapted to engage said web adjacent the side edges thereof and a bearing for sliding along said shafts carried by said movable head and movable therewith for supporting said shafts adjacent a cutting tool to prevent a separating movement of said shafts and rolls.

5. In a machine of the class described comprising in combination, a support, cutter heads on said support each including rotary cutting elements for acting on opposite edges of a web of material, one of said heads being adjustable with respect to the other, a suction device, flexible conduits connected to the intake thereof having nozzles on the open ends thereof which are disposed adjacent said cutters and one of said nozzles being secured to the movable head so as to be moved thereby and maintained adjacent the cutter accordingly as said head is moved with respect to the other.

In testimony whereof I have affixed my signature.

JOSEPH N. FOUNTAIN.